(12) United States Patent
Ha et al.

(10) Patent No.: US 8,691,110 B2
(45) Date of Patent: Apr. 8, 2014

(54) COOLANT COMPOSITION FOR FUEL CELL

(75) Inventors: Young Joo Ha, Busan (KR); Chang Yeol Jo, Busan (KR); Hong Ki Lee, Gyeonggi-do (KR)

(73) Assignee: Kukdong Jeyen Company Limited, Gyeonggi-do (KR)

( * ) Notice: Subject to any disclaimer, the term of this patent is extended or adjusted under 35 U.S.C. 154(b) by 0 days.

(21) Appl. No.: 13/806,632

(22) PCT Filed: Jun. 8, 2011

(86) PCT No.: PCT/KR2011/004205
§ 371 (c)(1),
(2), (4) Date: Jan. 7, 2013

(87) PCT Pub. No.: WO2011/162493
PCT Pub. Date: Dec. 29, 2011

(65) Prior Publication Data
US 2013/0092870 A1 Apr. 18, 2013

(30) Foreign Application Priority Data

Jun. 22, 2010 (KR) .................. 10-2010-0059239

(51) Int. Cl.
*C09K 5/00* (2006.01)
(52) U.S. Cl.
USPC .............. 252/71; 252/73; 252/74; 252/75
(58) Field of Classification Search
None
See application file for complete search history.

(56) References Cited

U.S. PATENT DOCUMENTS

| 4,462,921 A | 7/1984 | Peterson et al. |
| 7,393,464 B2 | 7/2008 | Wenderoth et al. |
| 7,588,695 B2 | 9/2009 | Wenderoth et al. |
| 2009/0266519 A1 * | 10/2009 | Marinho et al. ......... 165/104.19 |

FOREIGN PATENT DOCUMENTS

| KR | 90-006534 B1 | 9/1990 |
| KR | 10-2010-0045265 A | 5/2010 |

OTHER PUBLICATIONS

International Search Report for PCT/KR2011/004205.

* cited by examiner

*Primary Examiner* — Necholus Ogden, Jr.
(74) *Attorney, Agent, or Firm* — The PL Law Group, PLLC

(57) ABSTRACT

A coolant composition for a fuel cell, including (a) an alkylene glycol, (b) deionized water, and (c) a compound containing a trimethylsilyl group. The compound containing a trimethylsilyl group of the composition of the present invention prevents the oxidation of the alkylene glycol, and thus the generation of an acid is 700 ppm or less. Additionally, the compound prevent the oxidation of the alkylene glycol, thereby inhibiting the generation of an ionic material, and thus the rate of change of electrical conductivity (conductivity after oxidation/initial conductivity) can be maintained to be 40 times or less. Therefore, the coolant composition for a fuel cell of the present invention can be used as a coolant for a cooling system of a fuel cell driving device with an electrical conductivity of 40 μs/cm or less even without being frozen in the winter.

22 Claims, No Drawings

COOLANT COMPOSITION FOR FUEL CELL

CROSS REFERENCE TO RELATED APPLICATIONS AND CLAIM OF PRIORITY

This patent application claims benefit under 35 U.S.C. 119(e), 120, 121, or 365(c), and is a National Stage entry from International Application No. PCT/KR2011/004205, filed Jun. 8, 2011, which claims priority to Korean Patent Application No. 10-2010-0059239, filed Jun. 22, 2010, entire contents of which are incorporated herein by reference.

BACKGROUND

1. Field of the Invention

The present invention relates to a coolant composition for a fuel cell, including (a) alkylene glycol, (b) deionized water, and (c) a compound containing a trimethylsilyl group.

2. Description of the Related Art

A fuel cell is an engine that produces electricity using electro-chemical reaction of hydrogen and oxygen, and heat is generated incidentally. Scores of KW class stack have been developed to apply fuel cell vehicles for drive system and heat generations per unit volume are increased according to high-capacity of the fuel cell, whereby there has been increasing an importance of the cooling.

To obtain a required electrical output from a polymer electrolyte fuel cell, the fuel cell is constituted as a cell stack having a construction of many single cells which are connected in series. Ideally, hydrogen as the fuel is converted to electrical energy. Actually, there is some electrical resistance in cell, whereby part of energy is converted to heat energy rather than electrical energy. Since the heat is generated in cell and the cell temperature increases, a cooling plate is inserted several cells for cooling the cell.

Meanwhile, deionized Water (DI-Water) commonly used in early development stage has high electric resistance and it is excellent in electric insulation and cooling performance. However, DI-water has disadvantages that it is frozen below 0° C. and has cold startup of fuel cell vehicles. In addition, there is a problem that ion in the fuel cell system is easily contaminated to decline electronic heat sharply.

For these reasons, there has been growing interest in the coolant for the fuel cell which is not frozen in the winter and has an excellent electric insulation. Mixture solution of water and alkylene glycols, e.g. monoethylene glycol and monopropylene glycol, was used as a coolant for conventional fuel cells.

However, there was a problem that glycols used in the coolant for conventional fuel cells as main base substance generate an ionic substance to increase electrical conductivity.

Accordingly, there are needs for antioxidants preventing or delaying the oxidation of main base substance.

Throughout this application, several patents and publications are referenced and citations are provided in parentheses. The disclosure of these patents and publications is incorporated into this application in order to more fully describe this invention and the state of the art to which this invention pertains.

SUMMARY

The present inventors have made intensive studies to develop a coolant composition that prevents the oxidation of base, inhibits the generation of an ionic material and maintains antifreezing and low conductivity. As a result, the present inventors have prepared the present invention in such a manner that a compound containing a trimethylsilyl group is added with alkylene glycol contained in antifreezing coolant compositions for conventional fuel cell vehicles. They have found that the present composition has not only anti-freezing potency being similar to or higher than conventional compositions but also plausible anti-oxidation potency to alkylene glycols to prevent the increase in electrical conductivity value which is an important property in coolants for fuel cells.

Accordingly, it is an object of this invention to provide a coolant composition for a fuel cell.

Other objects and advantages of the present invention will become apparent from the detailed description to follow taken in conjugation with the appended claims and drawings.

In one aspect of the present invention, there is provided a coolant composition for a fuel cell, including (a) alkylene glycol, (b) deionized water and (c) a compound represented by the following Formula I:

[Formula I]

wherein $R_1$ is halo, $C_{1-10}$ alkyl, $-NR_2R_3$, azide, $C_{1-10}$ alkaneamide,

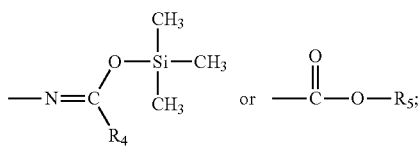

each of $R_2$, $R_3$, $R_4$, and $R_5$ is independently oxygen or $C_{1-10}$ alkyl.

The present inventors have made intensive studies to develop a coolant composition that prevents the oxidation of base, inhibits the generation of an ionic material and maintains antifreezing and low conductivity. As a result, the present inventors have prepared the present invention in such a manner that a compound containing a trimethylsilyl group is added with alkylene glycol contained in antifreezing coolant compositions for conventional fuel cell vehicles. They have found that the present composition has not only anti-freezing potency being similar to or higher than conventional compositions but also plausible anti-oxidation potency to alkylene glycols to prevent the increase in electrical conductivity value which is an important property in coolants for fuel cells.

According to a preferred embodiment, alkylene glycol of the present invention is selected from the group consisting of monoethylene glycol, monopropylene glycol, diethylene glycol, dipropylene glycol, glycerin, triethylene glycol and tripropylene glycol, more preferably monoethylene glycol, monopropylene glycol, diethylene glycol, dipropylene glycol or glycerin, and most preferably monoethylene glycol or monopropylene glycol.

The DI-water (deionized Water) used in the present invention is DI-water deionized by ion exchange, pure distilled water or distilled water which is distilled twice.

The compound contained in the present coolant composition for fuel cells has trimethylsilyl group as a structural nucleus represented by the Formula I. As used herein, the term "halo" used to define the Formula I of the compound of the present invention refers to a halogen element and includes, for example, fluoro, chloro, bromo and iodo, more preferably fluoro, chloro or bromo. The term "$C_1$-$C_{10}$ alkyl" refers to a linear or branched, saturated hydrocarbon group and includes, for example, methyl, ethyl, n-propyl, isopropyl, isobutyl, propyl, n-butyl, t-butyl, n-hexyl, n-octyl and t-octyl.

The term "$C_{1-10}$ alkaneamide" refers to a compound in which an amide group is linked to an alkyl group of 1-10 carbons.

According to a preferred embodiment, $R_1$ in the present invention is halo, $C_{1-5}$ alkyl, —$NR_2R_3$, azide, $C_{1-5}$ alkaneamide,

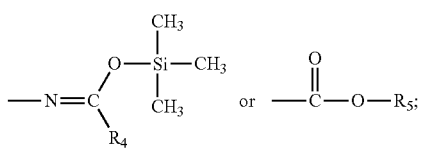

each of $R_2$, $R_3$, $R_4$, and $R_5$ is independently oxygen or $C_{1-5}$ alkyl, more preferably $R_1$ is halo, $C_{1-3}$ alkyl, —$NR_2R_3$, azide, $C_{1-3}$ alkaneamide,

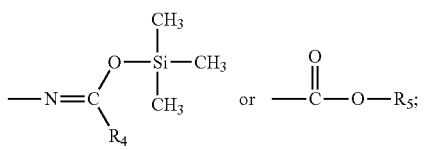

each of $R_2$, $R_3$, $R_4$, and $R_5$ is independently oxygen or $C_{1-3}$ alkyl.

According to a preferred embodiment, the compound of the present invention is trimethylsilyl bromide; trimethylsilyl chloride; trimethylsilyl azide; trimethylsilyl methyester; trimethylsilyl amine; trimethylsilyl dimethylamine; trimethylsilyl diethylamine; N-trimethylsilyl acetamide; or N,O-bis(trimethylsilyl)acetamide. Most preferably the compound is N,O-bis(trimethylsilyl)acetamide or N-trimethylsilyl acetamide.

The compound represented by the Formula I in the present invention prevents the oxidation of alkylene glycol which is base, thereby inhibiting the generation of an ionic material. As s result, it represents the characteristics that the increase rate of change of electrical conductivity is low and the initial conductivity is maintained over the long term in which is the most important feature of the present invention.

According to a preferred embodiment, the present composition includes 30-60% by weight of alkylene glycol, 35-65% by weight of deionized water and 0.001-5% by weight of the compound represented by the Formula I based on the total weight of the composition. More preferably, the composition includes 40-55% by weight of alkylene glycol, 42-59.99% by weight of deionized water and 0.01-3% by weight of the compound represented by the Formula I based on the total weight of the composition.

Where the composition of the present invention includes 30-60% by weight of alkylene glycol, 35-65% by weight of deionized water and 0.001-5% by weight of the compound represented by the Formula I based on the total weight of the composition, it determines an excellent effect that the compound represented by the Formula I prevents the oxidation of alkylene glycol to keep the fluctuation rate of electrical conductivity low level.

According to a preferred embodiment, the compound of the present invention prevents the oxidation of alkylene glycol to keep the fluctuation rate of electrical conductivity (post-oxidation conductivity/initial conductivity) below 40-folds, and more preferably 3 to 40-folds.

According to a preferred embodiment, the compound of the present invention prevents the oxidation of alkylene glycol to keep the fluctuation rate of electrical conductivity for graphite-based bipolar plate (post-oxidation conductivity/initial conductivity) below 40-folds, and more preferably 5 to 40-folds.

According to a preferred embodiment, the compound of the present invention prevents the oxidation of alkylene glycol to keep the fluctuation rate of electrical conductivity for aluminum test piece (post-oxidation conductivity/initial conductivity) below 20-folds, and more preferably 3 to 20-folds.

According to a preferred embodiment, the compound of the present invention is used as a coolant for a cooling system of a fuel cell driving device at below 40 μs/cm of an electrical conductivity, and more preferably 9-40 μs/cm.

According to a preferred embodiment, the amount of acid generated after oxidation of alkylene glycol in the composition of the present invention is no more than 700 ppm, and more preferably the amount of acid generated after oxidation for graphite-based bipolar plate is 150-700 ppm and the amount of acid generated after oxidation for aluminum test piece is 20-160 ppm.

The antifreezing coolant composition of the present invention may include pH regulators, dyes, antifoaming agents, or corrosion inhibitors. The corrosion inhibitors may include a variety of corrosion inhibitors known in the art within the range that does not affect the electrical conductivity of the antifreezing coolant composition of the present invention, for example, carboxylate, phosphate, nitrate, nitrite, molybdate, tungstate, borate, silicate, sulfate, sulfite, carbonate, amine salts, triazole and thiazole.

The present invention will now be described more specifically with reference to the following embodiments. It is to be noted that the following descriptions of embodiments of this invention are presented herein for the purposes of illustration and description only; it is not intended to be exhaustive or to be limited to the precise form disclosed.

According to an embodiment of the present invention, there is provided a coolant composition for a fuel cell, including (a) alkylene glycol, (b) deionized water and (c) a compound represented by the following Formula I:

[Formula I]

wherein $R_1$ is halo, $C_{1-10}$ alkyl, —$NR_2R_3$, azide, $C_{1-10}$ alkaneamide,

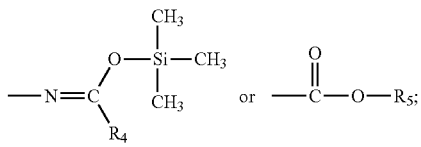 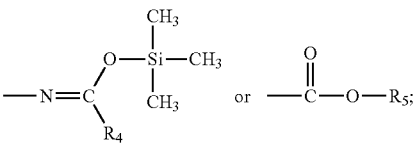

where each of $R_2$, $R_3$, $R_4$, and $R_5$ is independently oxygen or $C_{1-10}$ alkyl.

The present inventors have made intensive studies to develop a coolant composition that prevents the oxidation of base, inhibits the generation of an ionic material and maintains antifreezing and low conductivity. As a result, the present inventors have prepared an embodiment of the present invention in such a manner that a compound containing a trimethylsilyl group is added with alkylene glycol contained in antifreezing coolant compositions for conventional fuel cell vehicles. They have found that the present composition has not only anti-freezing potency being similar to or higher than conventional compositions but also plausible anti-oxidation potency to alkylene glycols to prevent the increase in electrical conductivity value which is an important property in coolants for fuel cells.

According to an embodiment, alkylene glycol of the present invention is selected from the group consisting of monoethylene glycol, monopropylene glycol, diethylene glycol, dipropylene glycol, glycerin, triethylene glycol and tripropylene glycol, more preferably monoethylene glycol, monopropylene glycol, diethylene glycol, dipropylene glycol or glycerin, and most preferably monoethylene glycol or monopropylene glycol.

The DI-water (deionized Water) used in the present invention may be DI-water deionized by ion exchange, pure distilled water or distilled water which is distilled twice.

The compound contained in an embodiment of the present coolant composition for fuel cells may have trimethylsilyl group as a structural nucleus represented by the Formula I. As used herein, the term "halo" used to define the Formula I of the compound of the present invention refers to a halogen element and includes, for example, fluoro, chloro, bromo and iodo, for example, fluoro, chloro or bromo. The term "$C_1$-$C_{10}$ alkyl" refers to a linear or branched, saturated hydrocarbon group and includes, for example, methyl, ethyl, n-propyl, isopropyl, isobutyl, propyl, n-butyl, t-butyl, n-hexyl, n-octyl and t-octyl.

The term "$C_{1-10}$ alkaneamide" refers to a compound in which an amide group is linked to an alkyl group of 1-10 carbons.

According to an embodiment, $R_1$ in the present invention is halo, $C_{1-5}$ alkyl, —$NR_2R_3$, azide, $C_{1-5}$ alkaneamide,

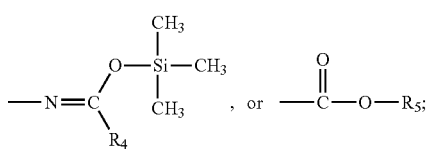

each of $R_2$, $R_3$, $R_4$, and $R_5$ is independently oxygen or $C_{1-5}$ alkyl. For example, $R_1$ is halo, $C_{1-3}$ alkyl, —$NR_2R_3$, azide, $C_{1-3}$ alkaneamide, each of $R_2$, $R_3$, $R_4$, and $R_5$ is independently oxygen or $C_{1-3}$ alkyl.

According to an embodiment, the compound of the present invention is trimethylsilyl bromide; trimethylsilyl chloride; trimethylsilyl azide; trimethylsilyl methyester; trimethylsilyl amine; trimethylsilyl dimethylamine; trimethylsilyl diethylamine; N-trimethylsilyl acetamide; or N,O-bis(trimethylsilyl)acetamide. Most preferably the compound is N,O-bis(trimethylsilyl)acetamide or N-trimethylsilyl acetamide.

The compound represented by the Formula I in the present invention prevents the oxidation of alkylene glycol which is base, thereby inhibiting the generation of an ionic material. As s result, it represents the characteristics that the increase rate of change of electrical conductivity is low and the initial conductivity is maintained over the long term in which is the most important feature of the present invention.

According to an embodiment, the present composition includes 30-60% by weight of alkylene glycol, 35-65% by weight of deionized water and 0.001-5% by weight of the compound represented by the Formula I based on the total weight of the composition. More preferably, the composition comprises 40-55% by weight of alkylene glycol, 42-59.99% by weight of deionized water and 0.01-3% by weight of the compound represented by the Formula I based on the total weight of the composition.

Where the composition of an embodiment of the present invention includes 30-60% by weight of alkylene glycol, 35-65% by weight of deionized water and 0.001-5% by weight of the compound represented by the Formula I based on the total weight of the composition, it determines an excellent effect that the compound represented by the Formula I prevents the oxidation of alkylene glycol to keep the fluctuation rate of electrical conductivity low level.

According to an embodiment, the compound of the present invention prevents the oxidation of alkylene glycol to keep the fluctuation rate of electrical conductivity (post-oxidation conductivity/initial conductivity) below 40-folds, and more preferably 3 to 40-folds.

According to an embodiment, the compound of the present invention prevents the oxidation of alkylene glycol to keep the fluctuation rate of electrical conductivity for graphite-based bipolar plate (post-oxidation conductivity/initial conductivity) below 40-folds, and more preferably 5 to 40-folds.

According to an embodiment, the compound of the present invention prevents the oxidation of alkylene glycol to keep the fluctuation rate of electrical conductivity for aluminum test piece (post-oxidation conductivity/initial conductivity) below 20-folds, and more preferably 3 to 20-folds.

According to an embodiment, the compound of the present invention is used as a coolant for a cooling system of a fuel cell driving device at below 40 μs/cm of an electrical conductivity, and more preferably 9-40 μs/cm.

According to an embodiment, the amount of acid generated after oxidation of alkylene glycol in the composition of the present invention is no more than 700 ppm. For example, and the amount of acid generated after oxidation for graphite-based bipolar plate is 150-700 ppm and the amount of acid generated after oxidation for aluminum test piece is 20-160 ppm.

The antifreezing coolant composition of an embodiment of the present invention may include pH regulators, dyes, antifoaming agents, or corrosion inhibitors. The corrosion inhibitors may include a variety of corrosion inhibitors known in the art within the range that does not affect the electrical conductivity of the antifreezing coolant composition of the present invention, for example, carboxylate, phosphate, nitrate, nitrite, molybdate, tungstate, borate, silicate, sulfate, sulfite, carbonate, amine salts, triazole and thiazole.

EXAMPLES OF THE INVENTION

The present invention will now be described in further detail by examples. It would be obvious to those skilled in the art that these examples are intended to be more concretely illustrative and the scope of the present invention as set forth in the appended claims is not limited to or by the examples.

Examples

Preparation Example

Preparation of Antifreezing Coolant Composition

Amounts of ingredients described as Table 1 were weighed using balance, added to DI-water and stirred until the mixture was became an homogeneous solution to prepare a antifreezing coolant composition. DI-water which is removed ions by water purification system was used in the present invention. Glycols such as ethylene glycol were purchased from DOW Chemical. N,O-bis(trimethylsilyl)acetamide was purchased from Lancaster. Tocopherol, xylitol, and N,N-dimethylacetamide were purchased from JUNSEI. N-(trimethylsilyl)acetamide was purchased from Acros Oranics.

TABLE 1

Content of antifreezing coolant composition

| Content (Weight %) | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Monoethylene glycol (MEG) | 49.995 | 49.975 | 49.95 | 49.9 | 49.5 | 49.995 | 50 | 49.995 | 49.9 |
| DI-water | 49.995 | 49.975 | 49.95 | 49.9 | 49.5 | 49.995 | 50 | 49.995 | 49.9 |
| N,O-bis(trimethylsilyl)acetamide | 0.01 | 0.05 | 0.1 | 0.2 | 1 | — | — | — | — |
| Tocopherol | — | — | — | — | — | — | — | 0.01 | — |
| xylitol | — | — | — | — | — | — | — | — | 0.2 |
| N-trimethylsilyl acetamide | — | — | — | — | — | 0.01 | — | — | — |
| total | 100 | 100 | 100 | 100 | 100 | 100 | 100 | 100 | 100 |

Experimental Example 1

Measurement on Electrical Conductivity and Amounts of an Acid Generation after Oxidation for an Antifreezing Coolant Composition An acid was generated by thermal oxidation of alkylene glycol to increase electrical conductivity. Thermal oxidation test was subject to measure the fluctuation of electrical conductivity and the generation amount of an acid before/after oxidation for antifreezing coolant composition. To promote oxidation, a component used in fuel cell cooling system was placed in an airtight container made with Teflon material. 180 ml of antifreezing coolant composition was added into the component. The airtight container was blocked and left for 500 hours at 100° C. oven. Electrical conductivities and generation amounts of an acid before/after test were measured using Thermo orion 162A conductivity meter and ion chromatography (IC).

A graphite-based bipolar plate as a non-metallic material among fuel cell system components (width 2 cm×height 2 cm) and a test piece of Al 2000-based as metallic material were used for the test and the results of test were represented in Table 2 and Table 3:

TABLE 2

Thermal oxidation test of antifreezing coolant composition for graphite-based bipolar plate

| | — | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| fluctuation of electrical | initial | 0.53 | 1.14 | 2.21 | 2.50 | 7.50 | 0.25 | 0.33 | 0.27 | 0.62 |
| | post-oxidation | 20.49 | 15.01 | 24.37 | 27.14 | 37.27 | 9.21 | 65 | 54 | 68 |

TABLE 2-continued

Thermal oxidation test of antifreezing coolant composition for graphite-based bipolar plate

| | — | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| conductivity (μs/cm) | fluctuation rate of electrical conductivity (post-oxidation conductivity/ initial conductivity) | 38.7 | 13.2 | 11 | 10.9 | 5 | 36.8 | 197 | 200 | 110 |
| generation amounts of an acid (ppm) | initial | 0 | 0 | 0 | 0 | 0 | 0 | 0 | 0 | 0 |
| | post-oxidation | 157 | 135 | 201 | 239 | 347 | 657 | 1300 | 1239 | 2816 |

As shown in Table 2, it was determined that both the amount of the acid generation and the fluctuation rate of the electrical conductivity after oxidation for graphite-based bipolar plate in Examples 1 to 6 were less than those in Comparative Examples 1 to 3. Therefore, it would be appreciated that N,O-bis(trimethylsilyl)acetamide including trimethylsilyl group and (trimethylsilyl)acetamide were prevent the oxidation of ethylene glycol as a base to keep the fluctuation rate of electrical conductivity (post-oxidation conductivity/initial conductivity) low level

TABLE 3

Thermal oxidation test of antifreezing coolant composition for test piece of Al 2000-based

| | — | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| fluctuation of electrical conductivity (μs/cm) | initial | 0.53 | 1.14 | 2.21 | 2.50 | 7.50 | 0.45 | 0.33 | 0.27 | 0.62 |
| | post-oxidation | 9.98 | 9.81 | 14.23 | 18.31 | 27.51 | 8.81 | 10.28 | 15.38 | 18.57 |
| | fluctuation rate of electrical conductivity (post-oxidation conductivity/ initial conductivity) | 18.8 | 8.6 | 6.4 | 7.3 | 3.7 | 19.5 | 31.2 | 57 | 30 |
| generation amounts of an acid (ppm) | initial | 0 | 0 | 0 | 0 | 0 | 0 | 0 | 0 | 0 |
| | post-oxidation | 29 | 20 | 41 | 49 | 71 | 152 | 216 | 324 | 287 |

Experimental Example 2

Measurement on Freezing Temperature for Antifreezing Coolant Composition

A freezing temperature for antifreezing coolant composition in the Example 1 was measured by KS M 2142. Briefly, the processes were as follow: first, acetone or methanol were put into cooling tank and added slowly dry ice to make coolant. 75-100 ml of the resultant was put into cooling tube to measure the freezing temperature using a thermometer. The end of the thermometer was placed in the center of the antifreezing coolant composition of interest for analysis. The results of measurement were represented in Table 4:

TABLE 4

Freezing temperature for antifreezing coolant composition in the Example 3

| Sample [Example 3:DI-water] | freezing temperature (° C.) |
|---|---|
| 50:50 | −34.7 |
| 40:60 | −22.1 |
| 30:70 | −13.3 |

TABLE 4-continued

Freezing temperature for antifreezing coolant composition in the Example 3

| Sample [Example 3:DI-water] | freezing temperature (° C.) |
|---|---|
| 20:80 | −7.2 |
| 10:90 | −3.1 |

As shown in Table 3, even though the antifreezing coolant composition in Example 3 was diluted with DI-water at certain weight ratios, its freezing temperature was measured to be maintained at below 0° C.

The features and advantages of one or more embodiments of the present invention will be summarized as follows:

The present invention provides a coolant composition for a fuel cell, including (a) alkylene glycol, (b) deionized water, and (c) a compound containing a trimethylsilyl group represented by the Formula I.

The compound containing a trimethylsilyl group of the composition in the present invention prevents the oxidation of alkylene glycol, whereby the generation of an acid is no more than 700 ppm.

Additionally, the compound prevents the oxidation of alkylene glycol to inhibit the generation of an ionic material, whereby there is an effect that reduces the increase fluctuation rate of electrical conductivity.

Therefore, the coolant composition for a fuel cell of the present invention may be used as a coolant for a cooling system of a fuel cell driving device with below 40 μs/cm of an electrical conductivity even without being frozen in the winter.

Having described exemplary embodiments of the present invention, it is to be understood that variants and modifications thereof falling within the spirit of the invention may become apparent to those skilled in this art, and the scope of this invention is to be determined by appended claims and their equivalents.

What is claimed is:

1. A coolant composition for a fuel cell, comprising:
(a) alkylene glycol;
(b) deionized water; and
(c) a compound represented by the following Formula I:

wherein $R_1$ is halo, $C_{1-10}$ alkyl, —$NR_2R_3$, azide, $C_{1-10}$ alkaneamide,

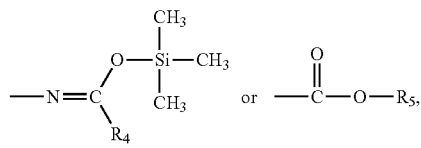

where each of $R_2$, $R_3$, $R_4$, and $R_5$ is independently oxygen or $C_{1-10}$ alkyl.

2. The composition according to claim 1, wherein alkylene glycol is selected from the group consisting of monoethylene glycol, monopropylene glycol, diethylene glycol, dipropylene glycol, glycerin, triethylene glycol and tripropylene glycol.

3. The composition according to claim 1, wherein $R_1$ is halo, $C_{1-5}$ alkyl, —$NR_2R_3$, azide, $C_{1-5}$ alkaneamide,

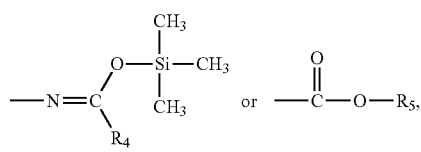

where each of $R_2$, $R_3$, $R_4$, and $R_5$ is independently oxygen or $C_{1-5}$ alkyl.

4. The composition according to claim 3, wherein $R_1$ is halo, $C_{1-3}$ alkyl, —$NR_2R_3$, azide, $C_{1-3}$ alkaneamide,

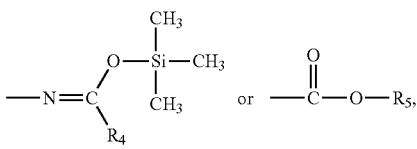

where each of $R_2$, $R_3$, $R_4$, and $R_5$ is independently oxygen or $C_{1-3}$ alkyl.

5. The composition according to claim 4, wherein the compound is trimethylsilyl bromide; trimethylsilyl chloride; trimethylsilyl azide; trimethylsilyl methyester; trimethylsilyl amine; trimethylsilyl dimethylamine; trimethylsilyl diethylamine; N-trimethylsilyl acetamide; or N,O-bis(trimethylsilyl)acetamide.

6. The composition according to claim 5, wherein the compound is N,O-bis(trimethylsilyl)acetamide or N-trimethylsilyl acetamide.

7. The composition according to claim 1, wherein the composition comprises 30-60% by weight of the alkylene glycol, 35-65% by weight of the deionized water and 0.001-5% by weight of the compound represented by the Formula I based on the total weight of the composition.

8. The composition according to claim 1, wherein the compound prevents the oxidation of alkylene glycol to keep the fluctuation rate of electrical conductivity (post-oxidation conductivity/initial conductivity) below 40-folds.

9. The composition according to claim 8, wherein the compound prevents the oxidation of alkylene glycol to keep the fluctuation rate of electrical conductivity for graphite-based bipolar plate (post-oxidation conductivity/initial conductivity) below 40-folds.

10. The composition according to claim 8, wherein the compound prevents the oxidation of alkylene glycol to keep the fluctuation rate of electrical conductivity for aluminum (post-oxidation conductivity/initial conductivity) below 20-folds.

11. The composition according to claim 1, wherein the composition is used as a coolant for a cooling system of a fuel cell driving device with below 40 μs/cm of an electrical conductivity.

12. A method of protecting a fuel cell from oxidation of alkylene glycol, comprising:
applying to the fuel cell a coolant composition comprising alkylene glycol, deionized water, and a compound represented by the following Formula I:

wherein $R_1$ is halo, $C_{1-10}$ alkyl, —$NR_2R_3$, azide, $C_{1-10}$ alkaneamide,

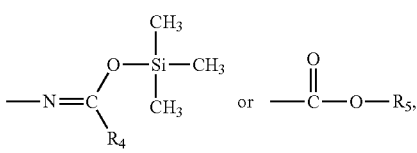

where each of $R_2$, $R_3$, $R_4$, and $R_5$ is independently oxygen or $C_{1-10}$ alkyl.

13. The method according to claim 12, wherein alkylene glycol is selected from the group consisting of monoethylene glycol, monopropylene glycol, diethylene glycol, dipropylene glycol, glycerin, triethylene glycol and tripropylene glycol.

14. The method according to claim 12, wherein $R_1$ is halo, $C_{1-5}$ alkyl, —$NR_2R_3$, azide, $C_{1-5}$ alkaneamide,

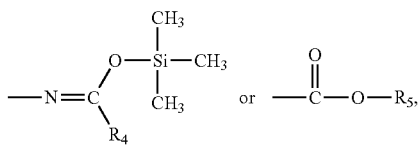

where each of $R_2$, $R_3$, $R_4$, and $R_5$ is independently oxygen or $C_{1-5}$ alkyl.

15. The method according to claim 14, wherein $R_1$ is halo, $C_{1-3}$ alkyl, —$NR_2R_3$, azide, $C_{1-3}$ alkaneamide,

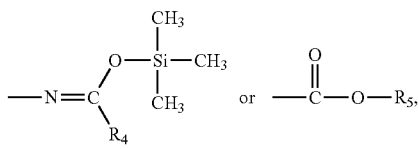

where each of $R_2$, $R_3$, $R_4$, and $R_5$ is independently oxygen or $C_{1-3}$ alkyl.

16. The method according to claim 15, wherein the compound is trimethylsilyl bromide; trimethylsilyl chloride; trimethylsilyl azide; trimethylsilyl methyester; trimethylsilyl amine; trimethylsilyl dimethylamine; trimethylsilyl diethylamine; N-trimethylsilyl acetamide; or N,O-bis(trimethylsilyl)acetamide.

17. The method according to claim 16, wherein the compound is N,O-bis(trimethylsilyl)acetamide or N-trimethylsilyl acetamide.

18. The method according to claim 12, wherein the composition comprises 30-60% by weight of the alkylene glycol, 35-65% by weight of the deionized water and 0.001-5% by weight of the compound represented by the Formula I based on the total weight of the composition.

19. The method according to claim 12, wherein the compound prevents the oxidation of alkylene glycol to keep the fluctuation rate of electrical conductivity (post-oxidation conductivity/initial conductivity) below 40-folds.

20. The method according to claim 19, wherein the compound prevents the oxidation of alkylene glycol to keep the fluctuation rate of electrical conductivity for graphite-based bipolar plate (post-oxidation conductivity/initial conductivity) below 40-folds.

21. The method according to claim 19, wherein the compound prevents the oxidation of alkylene glycol to keep the fluctuation rate of electrical conductivity for aluminum (post-oxidation conductivity/initial conductivity) below 20-folds.

22. The method according to claim 12, wherein the composition is used as a coolant for a cooling system of a fuel cell driving device with below 40 μs/cm of an electrical conductivity.

* * * * *